United States Patent
Richards et al.

(10) Patent No.: US 11,840,436 B2
(45) Date of Patent: Dec. 12, 2023

(54) MAST AND SUPPLEMENTARY OBJECT DETECTION SYSTEM FOR A MATERIAL HANDLING VEHICLE

(71) Applicant: The Raymond Corporation, Greene, NY (US)

(72) Inventors: Curtis D. Richards, Greene, NY (US); Anthony V. D'Accolti, Binghamton, NY (US); Jeffrey J. Kuss, Binghamton, NY (US)

(73) Assignee: The Raymond Corporation, Greene, NY (US)

( * ) Notice: Subject to any disclaimer, the term of this patent is extended or adjusted under 35 U.S.C. 154(b) by 683 days.

(21) Appl. No.: 16/837,682

(22) Filed: Apr. 1, 2020

(65) Prior Publication Data

US 2020/0317487 A1     Oct. 8, 2020

Related U.S. Application Data

(60) Provisional application No. 62/828,104, filed on Apr. 2, 2019.

(51) Int. Cl.
| | | |
|---|---|---|
| *B66F 9/08* | (2006.01) | |
| *B66F 9/07* | (2006.01) | |
| *B66F 9/12* | (2006.01) | |
| *B66F 9/06* | (2006.01) | |
| *B66F 9/075* | (2006.01) | |

(52) U.S. Cl.
CPC ............ *B66F 9/08* (2013.01); *B66F 9/07568* (2013.01); *B66F 9/127* (2013.01); *B66F 9/063* (2013.01); *B66F 9/0755* (2013.01)

(58) Field of Classification Search
CPC ........ B66F 9/08; B66F 9/07568; B66F 9/127; B66F 9/063; B66F 9/0755
See application file for complete search history.

(56) References Cited

U.S. PATENT DOCUMENTS

| | | |
|---|---|---|
| 4,918,362 A | 4/1990 | Christensen |
| 5,068,791 A | 11/1991 | Klopfleisch |

(Continued)

FOREIGN PATENT DOCUMENTS

| | | |
|---|---|---|
| CN | 200967732 Y | 10/2007 |
| CN | 102239455 A | 11/2011 |

(Continued)

OTHER PUBLICATIONS

Circa 2011—Three color photographs of lift truck.
European Patent Office. Extended European Search Report for application 20167612.9, dated Aug. 27, 2020.

*Primary Examiner* — Saul Rodriguez
*Assistant Examiner* — Ashley K Romano
(74) *Attorney, Agent, or Firm* — Quarles & Brady LLP (57) ABSTRACT

A material handling vehicle. The material handling vehicle including a vehicle body, an operator compartment, and a mast. The mast has a mounting platform, a first support member coupled to the mounting platform, a second support member coupled to the mounting platform, and a detection system coupled to the mast. The mast is coupled to the vehicle body at a frontward location relative to the operator compartment. The position of the mast on the vehicle body prevents the mast from impeding a field of view of an operator positioned in the operator compartment.

18 Claims, 9 Drawing Sheets

(56) References Cited

U.S. PATENT DOCUMENTS

| | | | |
|---|---|---|---|
| 6,767,175 | B2 | 7/2004 | Fujita |
| 7,278,509 | B2 | 10/2007 | Schroder |
| 9,278,839 | B2 | 3/2016 | Gilbride |
| 9,434,585 | B2 | 9/2016 | Gilbride |
| 9,522,817 | B2 | 12/2016 | Castaneda |
| 9,663,173 | B2 | 5/2017 | Wadey |
| D817,527 | S | 5/2018 | Dickman |
| 10,214,400 | B2 | 2/2019 | High |
| 2006/0231301 | A1 | 10/2006 | Rose |
| 2007/0269299 | A1 | 11/2007 | Ross |
| 2008/0071429 | A1* | 3/2008 | Kraimer ............... G05D 1/0033 701/2 |
| 2010/0176922 | A1 | 7/2010 | Schwab |
| 2011/0118903 | A1* | 5/2011 | Kraimer ............... G05D 1/0016 701/2 |
| 2011/0286007 | A1* | 11/2011 | Pangrazio ............. G01B 11/00 356/627 |
| 2012/0235804 | A1 | 9/2012 | Gilbride |
| 2012/0239238 | A1 | 9/2012 | Harvey |
| 2013/0190963 | A1 | 7/2013 | Kuss |
| 2014/0074341 | A1 | 3/2014 | Weiss |
| 2016/0223655 | A1 | 8/2016 | Weiss |
| 2018/0016126 | A1 | 1/2018 | Valfridsonn |
| 2019/0135598 | A1* | 5/2019 | Agarwal ............. G05D 1/0246 |

FOREIGN PATENT DOCUMENTS

| | | |
|---|---|---|
| CN | 108349440 A | 7/2018 |
| EP | 0340406 A1 | 11/1989 |
| EP | 3269679 A1 | 1/2018 |
| WO | 1985005474 A1 | 12/1985 |
| WO | 2018039556 A1 | 3/2018 |

\* cited by examiner

MAST AND SUPPLEMENTARY OBJECT DETECTION SYSTEM FOR A MATERIAL HANDLING VEHICLE

CROSS-REFERENCE TO RELATED APPLICATIONS

The present application is based on and claims priority to U.S. Provisional Patent Application No. 62/828,104, filed Apr. 2, 2019, and entitled "Mast and Supplementary Object Detection System for a Material Handling Vehicle." The entire disclosure of which is incorporated herein by reference in its entirety.

STATEMENT REGARDING FEDERALLY SPONSORED RESEARCH

Not Applicable.

FIELD OF THE INVENTION

The present invention relates to the field of material handling vehicles, and more specifically, to object detection systems for material handling vehicles.

BACKGROUND OF THE INVENTION

Material handling vehicles are designed in a variety of configurations to perform a variety of tasks. These types of vehicles are commonly used in a warehouse or a factory to transport, store, and retrieve materials and finished goods.

Figure 1:
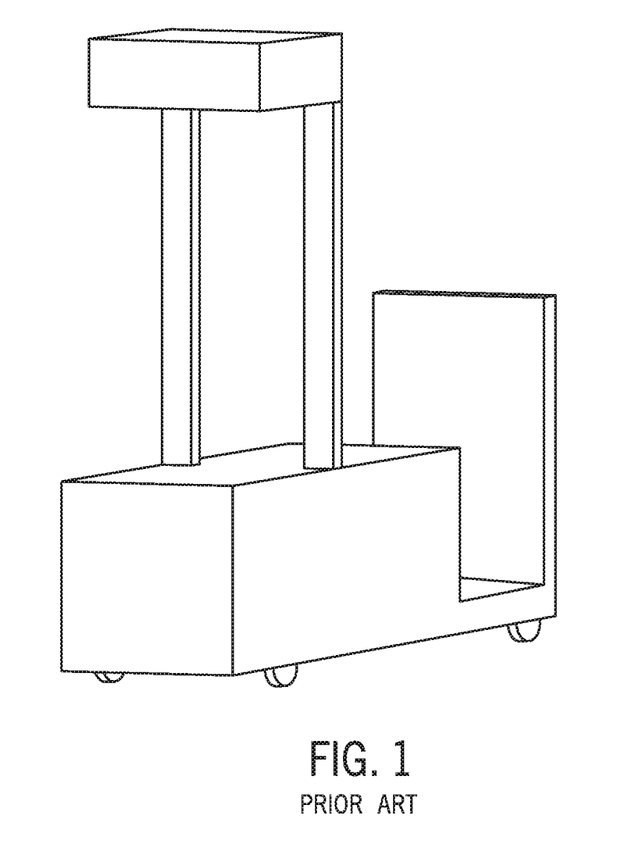
FIG. 1 is a perspective view of a system from the prior art.

Industrial material handling vehicles have also been designed to include sensing features that allow them to be an automatic guided vehicle ("AGV"). An AGV can be programmed to store travel routes and can include a control system which is integrated with the drive, steering, and braking systems for the vehicle. Among other reasons, sensing or locating features can be included in an AGV to detect the presence of an object to be lifted, as well as its position and orientation. This sensing or locating equipment, however, presents additional components (e.g. cameras, sensors, etc.) that must be mounted on the vehicle. Some material handling vehicles have included mounting systems, such as the one shown in FIG. 1, to secure navigation equipment to the vehicle's body.

SUMMARY OF THE INVENTION

Embodiments of the present invention provide novel systems and methods that include a mast with a supplementary object detection system.

Systems and methods are provided for a mast and a supplementary object detection system for a material handling vehicle. Some embodiments of the disclosure provide a material handling vehicle comprising: a vehicle body; an operator compartment; and a mast including: a mounting platform; a first support member coupled to the mounting platform; a second support member coupled to the mounting platform; and a detection system coupled to the mast, and wherein the mast is coupled to the vehicle body at a frontward location relative to the operator compartment, and wherein the position of the mast on the vehicle body prevents the mast from impeding a field of view of an operator positioned in the operator compartment.

In some embodiments, the material handling vehicle further includes: a display; and a steering mechanism configured to steer the material handling vehicle, and wherein the mounting platform of the mast is positioned below the display, and below the steering mechanism, and wherein the mounting platform of the mast is positioned forward relative to the display, and forward relative to the steering mechanism.

In some embodiments, the mounting platform has a upper side and an opposite bottom side, and further comprising an autonomous navigation unit, the autonomous navigation unit being secured to the upper side of the mounting platform, and wherein the detection system is secured to the bottom side of the mounting platform.

In some embodiments, the material handling vehicle has a highest point, and wherein the mast is positioned below the highest point of the material handling vehicle.

In some embodiments, the material handling vehicle further includes a display, and wherein the display includes the highest point of the material handling vehicle.

In some embodiments, the detection system includes: a first sensor configured to project a first detection zone, the first detection zone configured to detect an object positioned in the first detection zone; a second sensor configured to project a second detection zone, the second detection zone configured to detect an object positioned in the second detection zone, and wherein the first detection zone extends beyond the highest point of the material handling vehicle, and wherein the second detection zone extends beyond the highest point of the material handling vehicle.

In some embodiments, a position of the first sensor is adjustable thereby adjusting a spatial positioning of the first detection zone, and wherein a position of the second sensor is adjustable thereby adjusting a spatial position of the second detection zone.

In some embodiments, the first support member of the mast includes: a first region; a second region connected to the first region; and a third region connected to the second region, the third region being offset from the first region, and wherein the second support member of the mast includes: a fourth region; a fifth region connected to the fourth region; and a sixth region connected to the fifth region, the sixth region being offset from the fourth region.

In some embodiments, the third region of the first support member includes a first plurality of mounting locations to fasten the third region of the first support member to the vehicle body, and wherein the sixth region of the second support member includes a second plurality of mounting locations to fasten the sixth region of the second support member to the vehicle body.

In some embodiments, the first region of the first support member, and the fourth region of the second support member is connected to the mounting platform.

In some embodiments, the detection system includes: a first sensor configured to project a first detection zone, the first detection zone configured to detect an object positioned in the first detection zone; a second sensor configured to project a second detection zone, the second detection zone configured to detect an object positioned in the second detection zone.

In some embodiments, the first detection zone is planar and has a first portion and a second portion separated by a first gap, and wherein the second detection zone is planar and has a third portion and a fourth portion, separated by a second gap, wherein the first portion of the first detection zone and the third portion of the second detection zone extend beyond a highest point of the material handling vehicle, and wherein the first portion of the first detection zone, and the third portion of the second detection zone are separated by a third gap that includes the operator compartment.

In some embodiments, the first sensor, and the second sensor are two-dimensional LiDAR sensors.

In some embodiments, the first sensor is angled toward the second sensor, and the second sensor is angled toward the first sensor.

In some embodiments, the detection system includes a third sensor configured to project a third detection zone, the third detection zone configured to detect an object positioned in the third detection zone, wherein the first, second, and third detection zones are planar, and wherein the third detection zone intersects the first detection zone.

In some embodiments, the first detection zone has a first edge that contours a surface that supports the material handling vehicle, and wherein the first detection zone intersects the third detection zone at the first edge of the first detection zone.

Some embodiments of the disclosure provide a material handling vehicle comprising: a vehicle body; and a mast coupled to the vehicle body including: a mounting platform; a first support member coupled to the mounting platform; a second support member coupled to the mounting platform; and a detection system coupled to the mast, and wherein the material handling vehicle has a highest point, and wherein the mast is positioned below the highest point of the material handling vehicle.

In some embodiments, the material handling vehicle includes: an operator compartment; a display; a steering mechanism configured to steer the material handling vehicle, wherein the mast is coupled to the vehicle body at a frontward location relative to the operator compartment, wherein the mounting platform of the mast is positioned forward relative to the display and forward relative to the steering mechanism, and wherein the position of the mast on the vehicle body prevents the mast from impeding a field of view of an operator positioned in the operator compartment.

Some embodiments of the disclosure provide a method for installing a mast on a material handling vehicle having a vehicle body, and an operator compartment, the method comprising: providing the mast having: a mounting platform having an upper side, and an opposite lower side; a first support member coupled to the mounting platform; and a second support member coupled to the mounting platform; securing a detection system to the mast; securing a navigation unit to the mast, the navigation unit being an autonomous navigation unit; securing the mast to a front portion of the vehicle body, the front portion being frontward relative to the operator compartment.

In some embodiments, the detection system includes: a first sensor configured to project a first detection zone, the first detection zone configured to detect an object positioned in the first detection zone; a second sensor configured to project a second detection zone, the second detection zone configured to detect an object positioned in the second detection zone; and a third sensor configured to project a third detection zone, the third detection zone configured to detect an object positioned in the third detection zone, and the method further comprise: mounting the first sensor to lower side of the mounting platform; mounting the second sensor to lower side of the mounting platform; and mounting the third sensor to lower side of the mounting platform.

Some embodiments of the disclosure provide a material handling vehicle configured to be selectively controlled by a primary navigation unit, the material handling vehicle comprising: a vehicle body; a mast comprising: a frame including a mounting platform and support member extending from the mounting platform to the vehicle body; and a supplementary detection system secured to the mounting platform and including a plurality of sensors collectively providing a detection field, the supplementary detection system configured to detect an object in the detection field.

In some embodiments, a top side of the mast is positioned below a highest point on the material handling vehicle.

In some embodiments, the vehicle body includes an operator compartment configured for an operator; and a top side of the mast is positioned outside of a field of view of the operator while the operator is in the operator compartment.

In some embodiments, the primary navigation unit is secured to the top side of the mast, and the primary navigation unit is positioned outside of a field of view of the operator while the operator is in the operator compartment.

In some embodiments, the plurality of sensors includes at least one side sensor providing a first side detection zone with a portion that extends in a forward direction from the at least one side sensor, and a second side detection zone that extends in a backwards direction from at least one side sensor.

In some embodiments, the first side detection zone extends past a front side of the material handling vehicle.

In some embodiments, the second side detection zone extends past a back side the material handling vehicle.

In some embodiments, a portion of at least one of the first side detection zone and the second side detection zone extends above a highest extent of the material handling vehicle.

In some embodiments, the at least one side sensor includes a left side sensor configured to detect of an object on a left side of the material handling vehicle, and a right side sensor configured to detect an object on a right side of the material handling vehicle.

In some embodiments, the plurality of sensors includes a front sensor providing a front detection zone that extends past a front side of the material handling vehicle; and wherein the front detection zone is wider than the body of the material handling vehicle.

Some embodiments of the disclosure provide a mast configured to be coupled to a material handling vehicle having a vehicle body, the material handling vehicle configured to be selectively controllable by an autonomous navigation unit, the mast comprising: a frame including a mounting platform and support member extending from the mounting platform to the vehicle body; and a supplementary detection system secured to the mounting platform and including a plurality of sensors collectively providing a detection field, the supplementary detection system being configured to detect an object in the detection field.

In some embodiments, the mounting platform is positioned outside of a field of view of an operator in an operator compartment of the material handling vehicle while the mast is secured to the vehicle body.

In some embodiments, the mounting platform is configured to receive the autonomous navigation unit.

In some embodiments, the autonomous navigation unit is secured to a top side of the mounting platform, and the plurality of sensors are secured to a bottom side of the mounting platform.

In some embodiments, a portion of the detection field extends above the mounting platform.

In some embodiments, a first portion of the detection field extends from a front side of the mast and a second portion of the detection field extends from a back side of the mast.

In some embodiments, each sensor in the plurality of sensors provides a detection zone that forms a portion of the detection field.

In some embodiments, the plurality of sensors includes at least one side sensor providing at least one side detection zone and at least one front sensor providing at least one front detection zone.

In some embodiments, a portion of the least one side detection zone extends from a first side of the mounting platform in a direction of a second side of the mounting platform opposite the first side.

In some embodiments, at least one of the detection zones intersects with a detection zone from a different one of the plurality of sensors.

In some embodiments, at least one stop button configured to selectively inhibit movement of the material handling vehicle.

In some embodiments, the plurality of sensors includes at least one 2D LiDAR scanner.

Some embodiments of the disclosure provide a method for defining a detection field for a material handling vehicle, the method comprising the steps of: providing a front sensor; defining, with the front sensor, a front detection zone that extends past a front side of the material handling vehicle; providing at least one side sensor; and defining, with the at least one side sensor, a first side detection zone that extends in a forward direction from the at least one side sensor, and a second side detection zone that extends in a backwards direction from at least one side sensor.

In some embodiments, the first side detection zone extends past a front side of the material handling vehicle.

In some embodiments, the second side detection zone extends past a back side the material handling vehicle.

In some embodiments, the step of providing at least one side sensor comprises providing a left side sensor and providing a right side sensor.

These and still other advantages of the invention will be apparent from the detailed description and drawings. What follows is merely a description of some preferred embodiments of the present invention. To assess the full scope of the invention, the claims should be looked to as these preferred embodiments are not intended to be the only embodiments within the scope of the claims.

BRIEF DESCRIPTION OF THE DRAWINGS

The invention will be better understood and features, aspects and advantages other than those set forth above will become apparent when consideration is given to the following detailed description thereof. Such detailed description makes reference to the following drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also, it is to be understood that the use the phraseology and terminology used herein is for the purpose of description and should not be regarded as limiting. Furthermore, the use of "right", "left", "front", "back", "upper", "lower", "above", "below", "top", or "bottom" and variations thereof herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Unless otherwise specified or limited, phrases similar to "at least one of A, B, and C," "one or more of A, B, and C," etc., are meant to indicate A, or B, or C, or any combination of A, B, and/or C, including combinations with multiple or single instances of A, B, and/or C.

Certain operations of methods according to the invention, or of systems executing those methods, can be represented schematically in the FIGS. or otherwise discussed herein. Unless otherwise specified or limited, representation in the FIGS. of particular operations in particular spatial order can not necessarily require those operations to be executed in a particular sequence corresponding to the particular spatial order. Correspondingly, certain operations represented in the FIGS., or otherwise disclosed herein, can be executed in different orders than are expressly illustrated or described, as appropriate for particular embodiments of the invention. Further, in some embodiments, certain operations can be executed in parallel, including by dedicated parallel processing devices, or separate computing devices configured to interoperate as part of a large system.

The following discussion is presented to enable a person skilled in the art to make and use aspects of the present disclosure. Various modifications to the illustrated configurations will be readily apparent to those skilled in the art, and the generic principles herein can be applied to other configurations and applications without departing from aspects of the present disclosure. Thus, aspects of the present disclosure are not intended to be limited to configurations shown, but are to be accorded the widest scope consistent with the principles and features disclosed herein. The following detailed description is to be read with reference to the figures, in which like elements in different figures have like reference numerals. The figures, which are not necessarily to scale, depict selected configurations and are not intended to limit the scope of the present disclosure. Skilled artisans will recognize the non-limiting examples provided herein have many useful alternatives and fall within the scope of the present disclosure.

The invention will now be described more specifically with reference to the following embodiments. It is to be noted that the following embodiments are presented herein for purpose of illustration and description only. It is not intended to be exhaustive or to be limited to the precise form disclosed.

Disclosed herein is a mast with supplementary object detection features for use with material handling vehicles (e.g., forklifts, pallet trucks, etc.). The mast can be secured to a material handling vehicle and can support a plurality of sensors configured to detect the presence of an object in a detection field produced by the sensors, which can extend in front of, behind, to the sides of, below, and/or above the material handling vehicle. A mast can also be configured to support a primary navigation system for controlling functions of the material handling vehicle. While secured to a vehicle body, the mast can be configured to provide the detection field function while remaining outside of an operator's field of view and allowing the operation of other systems of the material handling vehicle.

Figure 2:
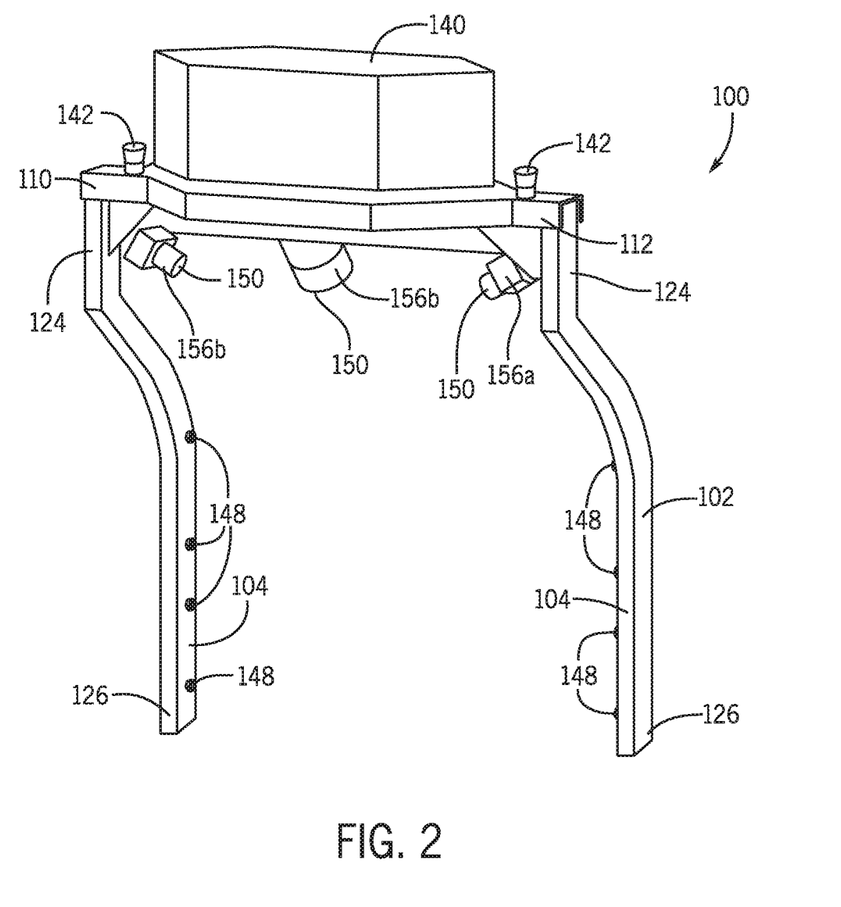
FIG. 2 is a perspective view of a mast including an object detection system according to aspects of the present disclosure.
Figure 3:
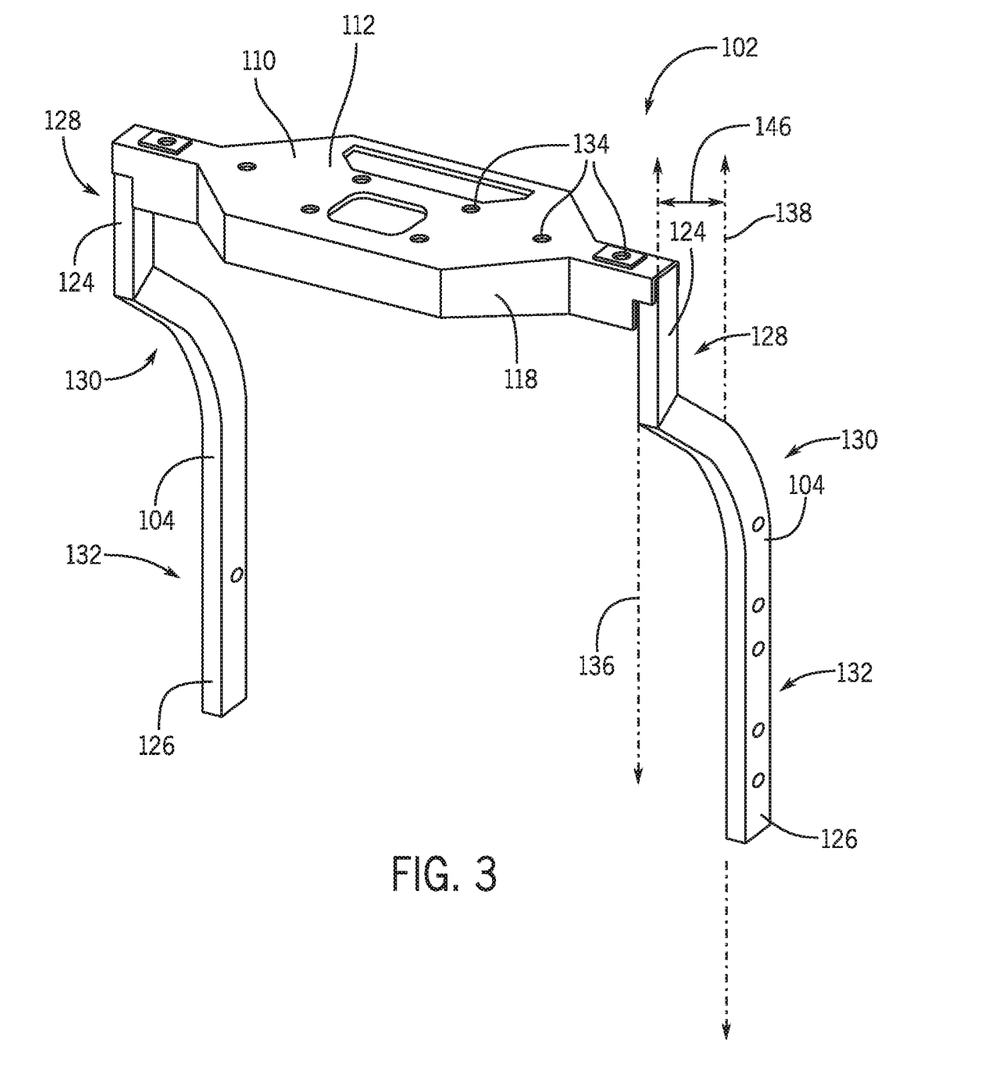
FIG. 3 is the frame from the mast of FIG. 2 according to aspects of the present disclosure.

FIGS. 2 and 3 show an example of a mast 100 for use with a material handling vehicle. The mast 100 can include a frame 102 with two support members 104 connected to a mounting platform 110. The mounting platform 110 can have a plate body 112 with a top surface and a bottom surface, and which narrows from a central region into two arms extending from opposite lateral sides of the central region. Side walls 118 run along the front and rear edges of mounting platform 110 and project downward from the bottom surface of the plate body 112. Proximate the arms of the mounting platform 110, which can be considerably narrower than the central region, the side walls 118 and the plate body 112 can define a downwardly-facing channel. A top end 124 of a support member 104 can be received in each channel, and the support members 104 can each extend downward to a respective bottom end 126 thereof.

It should be appreciated that at least one of the plate body, the side walls or the support members can be unitarily constructed, or can be a separate component coupled to an adjacent component with a weld, a mechanical fastener, bracketry, adhesives or any other method of connecting parts. At least one support members can be secured to an alternative portion of the mounting platform. In some embodiments, at least one of the mounting platform and at least one support members can be different than the illustrated mounting platform and support members. Further, an embodiment can include a different number of support members, at least one of which can be different that at least one other support member.

Each of the support members 104 includes an upper region 128, a central region 130, and a lower region 132. As shown, the upper region 128 includes the top end 124, and the lower region 132 includes the bottom end 126. The upper region 128 is substantially straight (e.g., deviating by one degree, two degree, three degree, four degree from straight, etc.) and is joined (or connected) to the central region 130, and extends along an axis 136. The central region 130 is curved and is joined to the upper region 128 at a top end, and is joined to the lower region 132 at a lower end. The lower region 132 is substantially straight, is joined to the central region 130, and extends along an axis 138. As illustrated in FIG. 3, the axes 136, 138 are separated by a distance 146, such that the upper region 128 is offset from the lower region 132 (e.g., by the curved region 132). In some cases, this configuration can be advantageous because a detection system (described in detail below) is free of other components on the material handling vehicle, such as a display, a steering mechanism, or a mounting structure that secures the display, or the steering mechanism. In other words, by having offset portions of the support members, the detection system has clearance from the other components of the material handling vehicle, and a primary navigation unit can be mounted to the mounting platform 110 with clearance (e.g., so that the navigation unit is free of the mounting structures that support the display and the steering mechanism). In some embodiments, the support members 104 are substantially parallel to each other (e.g., deviating by one degree, two degree, three degree, four degree from parallel, or more or less). In some embodiments, the support members 104 are substantially similar (or identical).

As shown in FIG. 2, each of the support members 104 include a plurality of mounting locations 148 that allow the support members 104 to be connected to the frame of the material handling vehicle. More specifically, the central region 130 has a mounting location 148, while the lower region 132 has three mounting locations 148. In the illustrated embodiment, the mounting locations 148 are implemented as being fastening holes, which in some cases can be threaded. The fastening holes are configured to receive a respective fastener, and the respective fastener is received within a hole in the body of the material handling vehicle, thereby fastening (or coupling) the central region 130, and the lower region 132 of the support member 104 to the body of the material handling vehicle. In alternative embodiments, the support members 104 can be coupled to the vehicle body in different ways (e.g., adhesives, welding, etc.).

Figure 4:
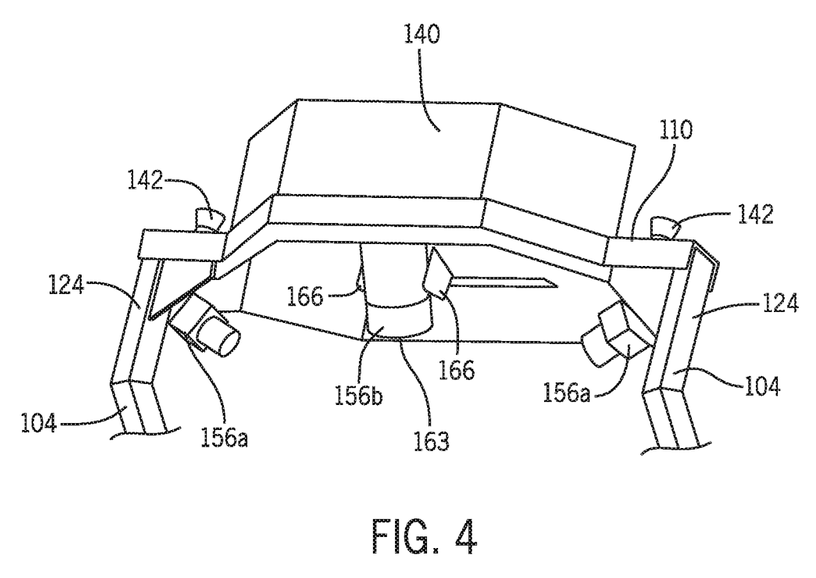
FIG. 4 is a detailed perspective view of the support platform and object detection system from the mast of FIG. 2 according to aspects of the present disclosure.

Referring now to FIGS. 2-4, the mounting platform 110 can include at least one mounting feature for securing components to the frame 102. For example, at least one mounting opening 134 can formed through the central region and/or the arms of the plate body 112, and through at least one of the side walls 118. The mounting openings 134 can be configured for securing brackets, electrical components, or other parts to the mounting platform 110 above and below the plate body 112. In some embodiments, a primary navigation unit 140 can be positioned on the top surface of the plate body 112 and can be secured thereto by at least one bolt that extends through a mounting opening 134. Further, at least one stop button 142 can be received in a mounting opening 134 formed through one of the arms and various circuits or other electrical components can be secured to at least one of the top or bottom surface of the plate body 112. Other openings through the plate body 112 can provide a passageway for wires or other components to pass through the mounting platform 110. In some embodiments, the primary navigation unit 140 can include electrical components (e.g., processors, memory, communication systems, etc.), that can allow communication between the material handling vehicle and a detection system 150. In some cases, the primary navigation unit 140 controls the material handling vehicle (e.g., steering, braking, etc.).

In some embodiments, the primary navigation unit 140 allows the material handling vehicle to be an automatic guided vehicle ("AGV"). For example, the primary navigation unit 140 can allow interfacing between the detection system 150, and other cameras, geographic positioning systems ("GPS"), and motion sensors, etc. The primary navigation unit 140 provides sensing, navigation capabilities, computational resources, etc., to automatically guide the material handling vehicle. In some cases, the primary navigation unit 140 can automatically guide the material handling vehicle, but the control by the primary navigation unit 140 can be overridden when an operator engages the display, a stop button, initiates a steering action, initiates a braking action, etc.

Figure 5A:
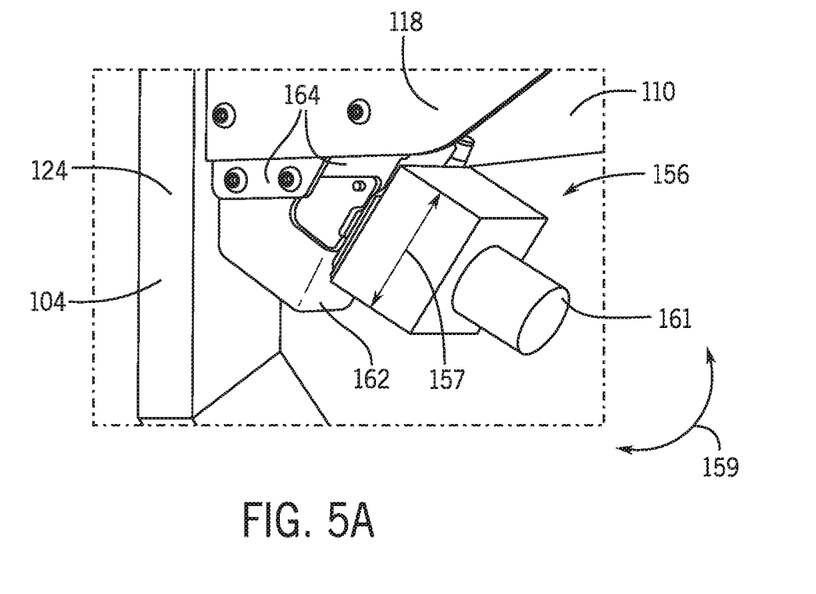
FIG. 5A is a detailed view of the object detection system and mounting features from the mast of FIG. 4 according to aspects of the present disclosure.
Figure 5B:
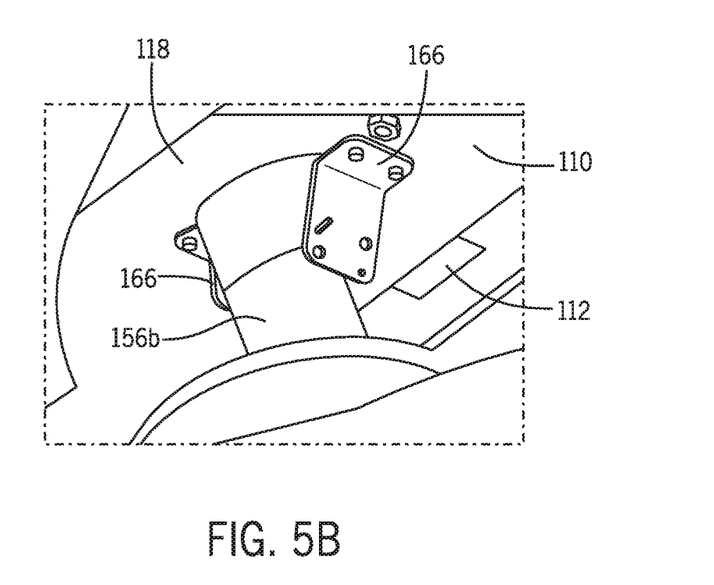
FIG. 5B is another detailed view of the object detection system and mounting features from the mast of FIG. 4 according to aspects of the present disclosure.

Looking to FIGS. 4, 5A, and 5B, the mounting platform 110 can be configured to support a supplementary detection system 150 that includes sensors 156a, and a sensor 156b, all positioned below the plate body 112. In the illustrated embodiment, the supplementary detection system 150 can include two side sensors 156a positioned on opposite lateral sides of the mounting platform 110 proximate the support members 104 and a front sensor 156b. Each of the sensors 156a, 156b can be a two-dimensional LiDAR sensor (e.g., a light radar sensor, or laser scanning sensor) configured to project a detection zone to detect objects therein (see, e.g., FIGS. 8A-8C). In some embodiments, however, other types of sensors can be implemented. Each of the sensors 156a can be secured to the mounting platform 110 with mounting brackets 162, 164, and the sensor 156b can be secured to the mounting platform 110 with a mounting bracket 166. As illustrated in FIG. 5A, a side sensor 156a can be connected to an adjustable bracket 162, and the adjustable bracket 162 can be movably coupled to two side wall brackets 164 secured to opposite sides of a downwardly-facing channel of the mounting platform 110. The front sensor 156b can be supported by two L-shaped brackets 166 that extend downward from the central region of the plate body 112 to movably receive opposite sides of the front sensor 156b. The orientation of the sensors 156a, 156b relative to the mounting platform 110 can be selectively adjusted by loosening at least one adjustable fastener used to couple the mounting brackets 162, 164, 166 and the sensors 156a, 156b to each other. Once a sensor 156a, 156b is in the desired position, the respective adjustable fastener(s) can be tightened to hold the sensor 156a, 156b in that position.

In some embodiments, the brackets 162, 164 can allow for translation of the respective sensor 156a along an axis 157 that coincides with a surface of the sensor 156a, which is orthogonal to a surface of the sensor 156a that is mounted to the bracket 162. Additionally, the brackets 162, 164 can allow for rotation (e.g., pitch adjustment) of the sensor 156a in a counterclockwise or clockwise direction as indicated by reference numeral 159, which coincides with the axis 157. In other words, the sensor 156a can be adjusted to pivot about the axis 157 upwardly towards the mounting platform 110, or downwards away from the mounting platform 110. This way, a surface 161 of the sensor 156a that projects the detection zone 181 can be translated along axis 157, and can be pivoted about axis 157 (e.g., adjusting the pitch of the surface 161) in a counterclockwise or clockwise direction relative to the view in FIG. 5A. In some embodiments, a surface 163 of the sensor 156b that projects the detection zone 182 can be pivoted toward or away from the mounting platform 110 (e.g., to adjust the pitch of the surface 163), while being confined between the brackets 166 (e.g., holes in the brackets can adjust the pivoting angle of the sensor 156b). By adjusting the orientation, or translational position of the sensors 156a, or sensors 156b, the corresponding projected detection zones 181, 182 are also spatially moved.

It should be appreciated that some embodiments can include at least one mounting bracket or other mounting feature that is different from at least one other mounting feature. Some embodiments can include a different number of mounting features than illustrated, and at least one mounting feature can be positioned in a different location. For example, a mounting bracket can be secured to the top of a mounting platform or to a support member. While the illustrated embodiment includes adjustable screws, some embodiments can include at least one adjustable fastener that is different that another one of the adjustable fasteners.

Figure 6:
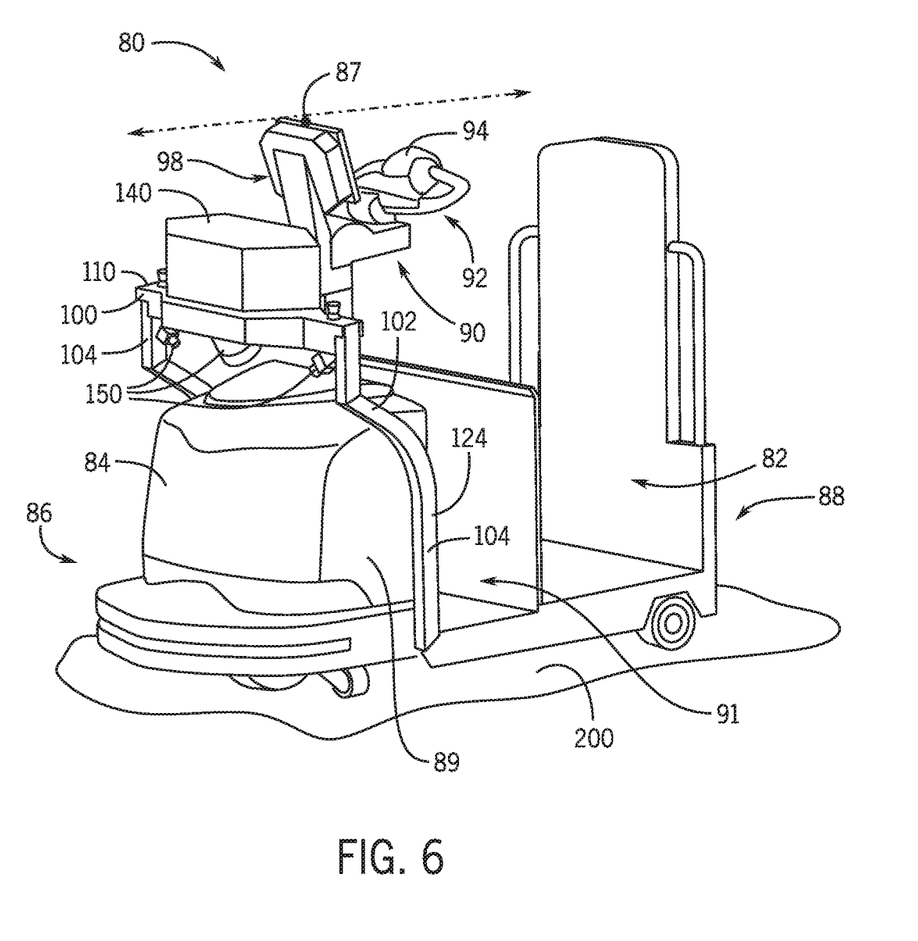
FIG. 6 is a perspective view of a material handling vehicle having the mast of FIG. 2, according to aspects of the present disclosure.
Figure 7:
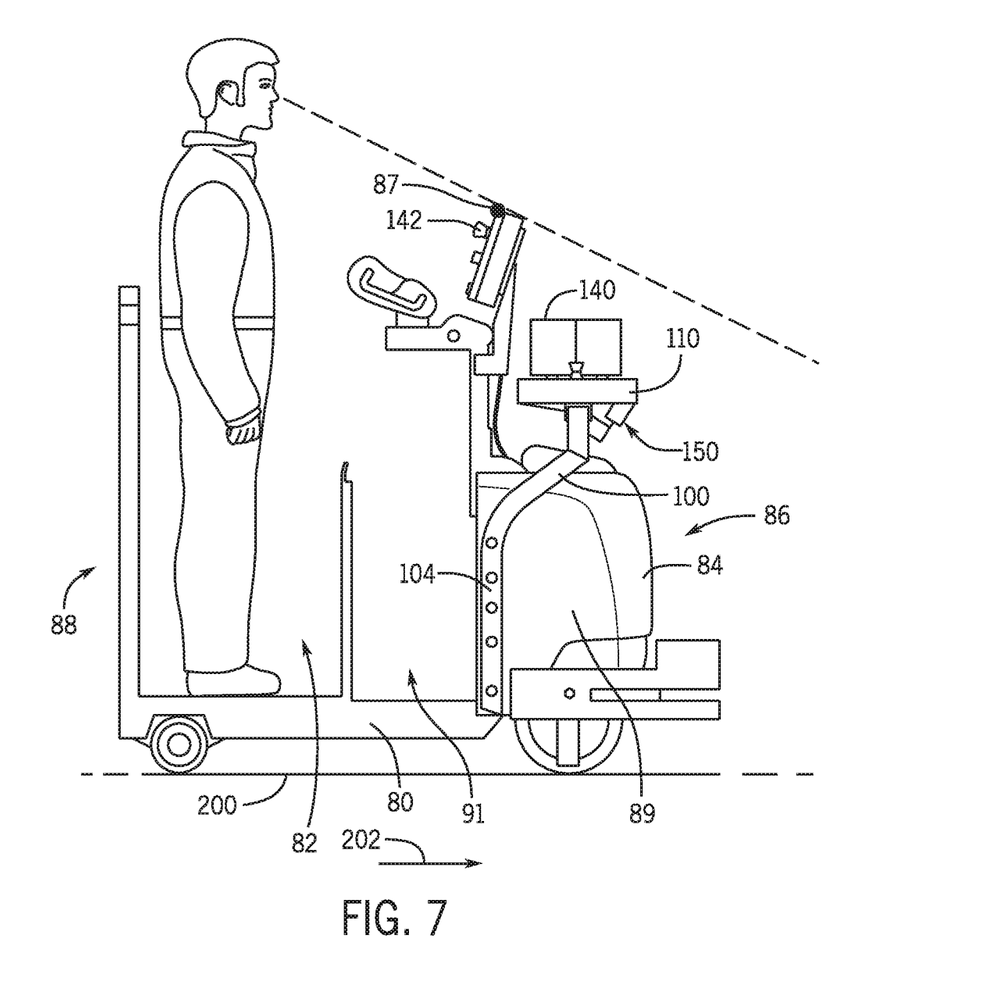
FIG. 7 is a side elevation view of the material handling vehicle of FIG. 6 with an operator according to aspects of the present disclosure.

In some embodiments, a mast can be attachable to a variety of material handling vehicles. For example, as illustrated in FIGS. 6-7, the mast 100 can be attached to a material handling vehicle 80 at a position proximate a front end 86 of the material handling vehicle 80 opposite a rear end 88 of the material handling vehicle 80, and in front of an operator compartment 82. In some embodiments, the mast 100 can be attached to a material handling vehicle that does not include an operator compartment. The support members 104, which can extend along the left and right sides of the vehicle body 84, can include at least one attachment feature, such as an attachment opening, for rigidly securing the mast 100 to the material handling vehicle 80, as described above. The support members 104 can also be hollow to permit wires or any other part to extend between the mounting platform 110 and the vehicle body 84. When attached to the vehicle body 84, the frame 102 can follow the contours of the vehicle body 84 so that the mast 100 has a low profile. For example, as illustrated in FIG. 7, the frame 102 can be dimensioned so that the primary navigation unit 140 and the mast 100—including the support members 104—remain outside of an operator's field of view while the operator is in the operator compartment 82 (when one is included).

In some embodiments, the material handling vehicle 80 includes a fork carriage with load bearing forks (not shown), but generally situated beyond the rear end 88 of the material handling vehicle 80, a motor compartment 89 housing a motor (not shown), a battery compartment 91 for housing a battery (not shown), a support 90, a steering mechanism 92 having a throttle control 94, and a display 98. The support 90 is connected to and extends from the vehicle body 84 and provides a mounting location for the steering mechanism 92, and the display 98. Thus, the steering mechanism 92 and the display 98 are also coupled to the vehicle body 84 via the support 90. As shown, the display 98, which includes a housing, also includes a stop button 142, which when pressed, the material handling vehicle 80 stops. In the illustrated embodiment, the mast 100 is positioned frontward relative to the operator compartment 82, and is positioned frontward relative to the steering mechanism 92 (which steers, or otherwise turns the material handling vehicle 80). Additionally, the mounting platform 110 including the primary navigation unit 140 is positioned frontward relative to the support 90, the steering mechanism 92, and the display 98. In some embodiments, the mounting platform 110 is positioned below the display 98, and below the steering mechanism 92. As described above, the offset configuration of the support members 104 provides clearance for the support 90, the steering mechanism 92, and the display 98.

In some embodiments, the material handling vehicle 80 includes a highest point 87, which in the illustrated embodiment, is defined on the display 98. However, in alternative embodiments, the highest point 87 can be on other portions or locations of a material handling vehicle, such as a telescoping mast that raises the forks. Importantly, the mast 100 and the components coupled to the mast including the primary navigation unit 140, and the detection system 150 are positioned below the highest point 87 on the material handling vehicle 80. This can be advantageous for a number of reasons. First, the mast 100 having the primary navigation unit 140, and the detection system 150 are situated closer to the vehicle body 84 and thus, these components can be closer to a center of mass of the material handling vehicle 80, which can decrease vibrations (that can be felt by the detection system 150). Additionally, the mounting locations 148, which span most of the length of the support members 104 provide securement locations (e.g., fastening locations) to the vehicle body 84, and thus the distance between an uppermost fastening location on the mast 100, and the detection system 150 is relatively short. In other words, a distance between a given sensor of the detection system 150 and the uppermost fastening location on the mast is short, and thus the mast 100 can be more structurally sound, and less prone to vibrational interferences that can be felt by the sensors of the detection system 150. Second, the relatively short height of the mast 100, being below the highest point 87 allows the material handling vehicle 80 to operate in environments that have clearance heights. In other words, the mast 100 does not limit the ability of the material handling vehicle 80 for operating in zones having a height clearance. Third, the detection system 150 is relatively close to a surface 200 (e.g., a floor, a road, etc.) that the material handling vehicle 80 is supported by and disposed on, to travel in a direction 202 defined from the rear end 88 to the front end 86 of the material handling vehicle 80. Thus, the detection system 150 is closer to obstacles that the material handling vehicle 80 can encounter on the surface 200 (e.g., which can be advantageous in that the time, such as sensor travel time, and computation time, to detect an obstacle can be decreased). Lastly, the mast 100 remains outside of the field of view of an operator positioned in the operator compartment 82.

In some embodiments, the mast 100 can also provide a clear field of view around the material handling vehicle 80 for the primary navigation unit 140 (when one is included) and the supplementary detection system 150. This can allow the sensors 156a, 156b to provide a detection field, such as the detection field 180 illustrated in FIGS. 8A-8C, for example. As previously mentioned, the sensors 156a can project a detection zone 181 having detection regions 184, 186, and the sensor 156b can project a detection zone 182, where the detection zones 181, 182 and the detection zone 182 collectively form the detection field 180. The front sensor 156b can be configured to provide a front detection zone 182 extending towards the front side 86 of the material handling vehicle 80 at a downward angle. The front detection zone 182 can also extend laterally outward (e.g., increasing in width away from the front end 88 of the material handling vehicle 80) so that it is wider than the material handling vehicle 80 at the point where the front detection zone 182 intersects with the surface 200. Generally, the detection zones 181, 182 are configured to detect an object positioned within the respective detection zones 181, 182 including regions within a given detection zone. For example, if an object were positioned within the region 184 of the detection zone 181, the sensor 156a (and/or corresponding circuitry within, for example, the navigation unit 140, or the detection system 150) can determine or sense that the object is positioned within the region 184, of the detection zone 181. As illustrated, the detection zone 182 can be planar, and can be trapezoidal in shape. However, in alternative embodiments different shapes of the regions 184 can be implemented (e.g., triangles, etc.).

Figure 8A:
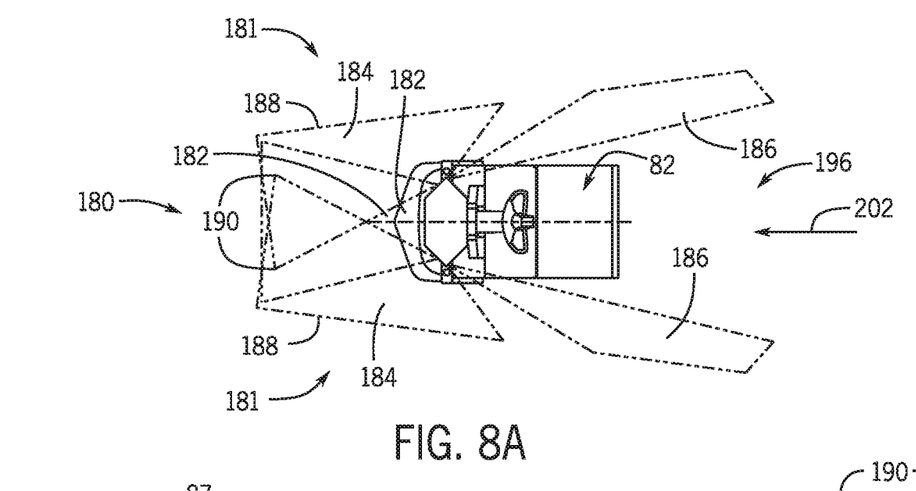
FIG. 8A is a top-down plan view of the material handling vehicle of FIG. 6 with a detection field according to aspects of the present disclosure.
Figure 8B:
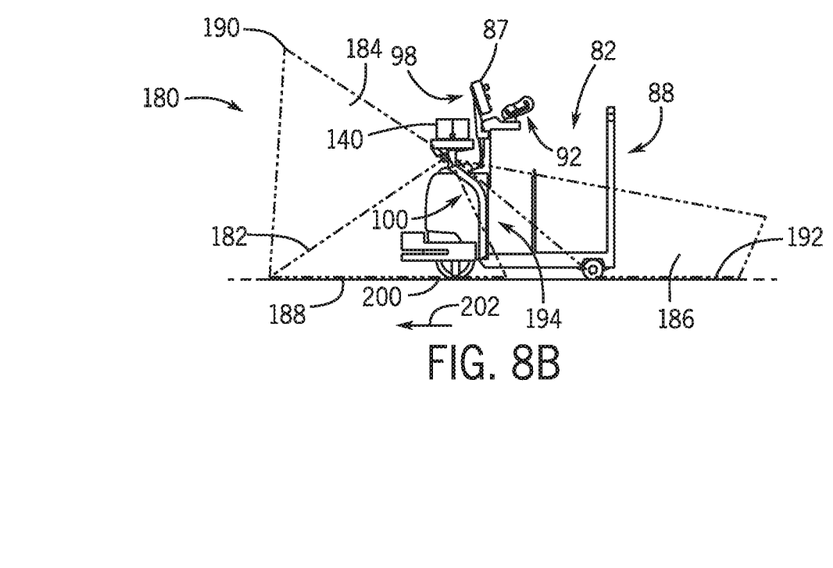
FIG. 8B is a side elevation view of the mast, material handling vehicle, and detection field of FIG. 8A according to aspects of the present disclosure.
Figure 8C:
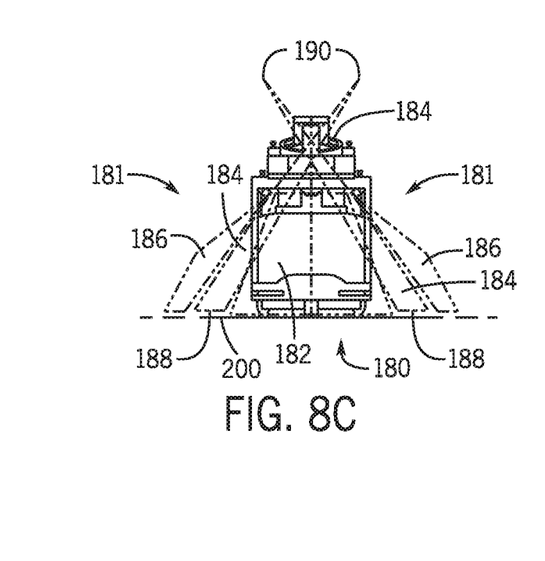
FIG. 8C is a front elevation view of the mast, material handling vehicle, and detection field of FIG. 8B according to aspects of the present disclosure.

The side sensors 156a can each define (or project) a detection zone 181 having a first side region 184, and a second side region 186. In some embodiments, one of the sensors 156a can be configured as being a left side sensor projecting the corresponding detection zone 181 on the right side of the material handling vehicle 80, and the other of the sensors 156a can be a right side sensor projecting the corresponding detection zone 181 on the right side of the material handling vehicle 80. Thus, the sensor 156a being the right side sensor projects the detection zone 181 having the detection regions 184, 186 on the right side of the material handling vehicle 80, while the sensor 156a being the left side sensor projects the detection zone 181 having the detection regions 184, 186 on the left side of the material handling vehicle 80.

As shown, the first side region 184 can extend outwardly (from one of the side sensors 156a) away from the front end 86 in one direction (e.g., along the direction of travel 202), and towards the rear end 88 and away from the front end 86 (e.g., against the direction of travel 202). In some embodiments, the first side region 184 can be angled to include a low edge 188 and a high end 190. The low edge 188 of the first side region 184 can contour (and extends along) the surface 200 (and can intersect the surface 200), such that the edge of the first side region 184 extends beyond the front end 86, and extends towards the rear end 88. In some embodiments, a first point of the edge 188 of the region 184 is in front of the corresponding sensor 156a, and a second point of the edge 188 of the region 184 is behind the corresponding sensor 156a. For example, the first point of the region 184 can be positioned in front of the material handling vehicle 80 (e.g., beyond the front end 86) and the second point of the region 184 can be positioned towards the rear 86 of the material handling vehicle 80. In some embodiments, however, the low end of the region 184 can intersect with the surface 200 only in front of the material handling vehicle 80, at a location beyond the front end 86, or only between the front and back ends of the material handling vehicle (e.g., situated between the front end 86 and the rear end 88). As shown, the low edge 188 of the region 184 is substantially straight, and substantially parallel to the surface 200.

In some embodiments, the high end 190 of the region 184 can be positioned above the side sensors 156a so that a portion of the region 184 extends upwards. For example, as illustrated in FIGS. 8B and 8C, the high end 190 of the region 184 is positioned above the highest point on the material handling vehicle 80. Additionally or alternatively, the high end 190 of the region 184 can be positioned on a side laterally opposite from the respective low end so that the region 184 is angled laterally (e.g., angled relative to the view in FIG. 8C) across the vehicle body 84. For example, as illustrated in FIGS. 8A and 8C, the high end 190 of the left side region 184 can be positioned to the right of the center of the material handling vehicle 80, and the high end 190 of the right side region 184 can be positioned to the left of the center of the material handling vehicle 80. Between their low ends and their high ends, the regions 184 can cross through each other at an intersection between the two side sensors 156a. In some embodiments, however, the regions 184 do not intersect with each other. As shown, the region 184 is planar, and is trapezoidal in shape. However, in alternative embodiments different shapes of the regions 184 can be implemented (e.g., triangles, etc.).

In the illustrated embodiment, the region 186 extends downwardly toward the surface 200, outwardly (e.g., with respect to the view in FIG. 8C away from the vehicle body 84), and away from the corresponding region 184 from the respective side sensor 156a. In some embodiments, and as illustrated, the region 186 includes a lower edge 192 that, similarly to the lower edge 188, contours and extends along the surface 200. The edge 192 (and the region 186) extends beyond the rear end 86 of the material handling vehicle 80. In some embodiments, the regions 184, 186 are separated by a gap 194, where the gap 194 also separates the edges 188, 192. In some cases, such as in the illustrated embodiment of FIG. 8B, the mast 100, and specifically the support members 104, are positioned within the gap 194. This way, the detection zone 181 is not obstructed by the mast 100.

As shown in FIG. 8C, with respect to the center of the material handling vehicle 80, the region 186 extends outwardly (e.g., away from the vehicle body 84) at an angle that is greater than the angle a portion of the region 184 extends from the sensor 156a (e.g., the edge 188 of the region 184). Additionally, the region 186 can extend towards the rear end 86 from the respective sensor 156a at an angle that is smaller than an angle a portion of the region 184 (such as the high end 190) extends from the respective sensor 156a. As shown, the region 186 is planar, and is trapezoidal in shape. In some cases, the shape and positioning of the region 186 allows for an unobstructed view, while considering parameters such as vehicle pivoting. However, in alternative embodiments different shapes of the regions 186 can be implemented (e.g., triangles, etc.).

In some embodiments, the lower edge 192 of the region 186 intersects the surface 200 along the respective side of the material handling vehicle 80. For example, as illustrated in FIGS. 8A and 8B, the region 186 intersects with the surface 200 at the lower edge 192. The lower edge 192 can have a first point positioned frontward of the rear end 88, and can have a second point positioned beyond the rear end 88 in the rearward direction. In some embodiments, however, the side regions 186 can intersect with the surface 200 only beyond the rear end 88 (e.g., in a direction opposite the direction 202), or in some cases the side regions 186 can intersect with the surface 200 only bounded between the front end 86 and the rear end 88 of the material handling vehicle 80. In some embodiments, the regions 186 can extend above the material handling vehicle 80, such as above the highest point 87. In some embodiments, and as illustrated, the regions 186 are separated by a gap 196, which includes the operator compartment 82. This way, the operator situated in the operator compartment 82 is not "sensed" by being situated in the detection zones (e.g., the regions 186). As also shown, the region 186 is planar, and is trapezoidal in shape. However, in alternative embodiments different shapes of the regions 186 can be implemented (e.g., triangles, etc.).

In some embodiments, because of its position on the vehicle body 84, the mast 100 can be configured to provide access to the supplementary detection system. This can permit the sensors 156a, and the sensor 156b to be adjusted to provide a detection zone that is different from those shown. It should also be appreciated that some embodiments can include a supplementary detection system with a detection field that has at least one detection zone that is differently shaped, sized, and/or oriented than the illustrated detection zones. For example, at least one of a first side region of a side detection zone, a second side region of a side detection zone, and a front detection zone can have a shape and size that is different than that of the illustrated detection zones. Some embodiments can include a region of a side detection zone that extends upwards from a side sensor. At least one first side detection region and/or at least one second side detection region can be angled differently than in the illustrated embodiment. Further, detection fields can include at least one of a first side detection region, a second side detection region, a front detection zone, and an additional detection zone that intersects with at least one other sensors zone.

In some embodiments, a detection field can include at least one additional detection zone, and the at least one additional detection zone can extend in a front of a material handling vehicle, behind a material handling vehicle, to the left of a material handling vehicle, to the right of a material handling vehicle, above a material handling vehicle, below a material handling vehicle, or any combination thereof. Further, some supplementary object detection systems can include at least one side sensor configured to provide a detection zone having a single detection region or more than two detection regions. In some embodiments, a front sensor can be configured to project a detection zone having a plurality of regions. A supplementary detection system could also provide at least one of the illustrated detection zones with a different sensor configuration. Some embodiments can include additional sensors or fewer sensors than the illustrated embodiments, and at least one sensor can be a different type of sensor than at least one other sensor. Further, some supplementary detection systems can include other components, such as a mirror or a lens.

Once the mast 100 is attached to the vehicle body 84, the supplementary detection system 150 can be configured to send data, control signals, or otherwise communicate with the material handling vehicle 80, the primary navigation unit 140, or any associated systems (e.g., the motor, brakes, etc.). For example, when an object is detected in the detection field 180, the supplementary detection system 150 can be configured to communicate that an object was detected and the detection zone it was detected in to the material handling vehicle 80 (or to the primary navigation unit 140). The supplementary detection system 150 can also be configured to communicate the same or similar information to the primary navigation unit 140.

Figure 9:
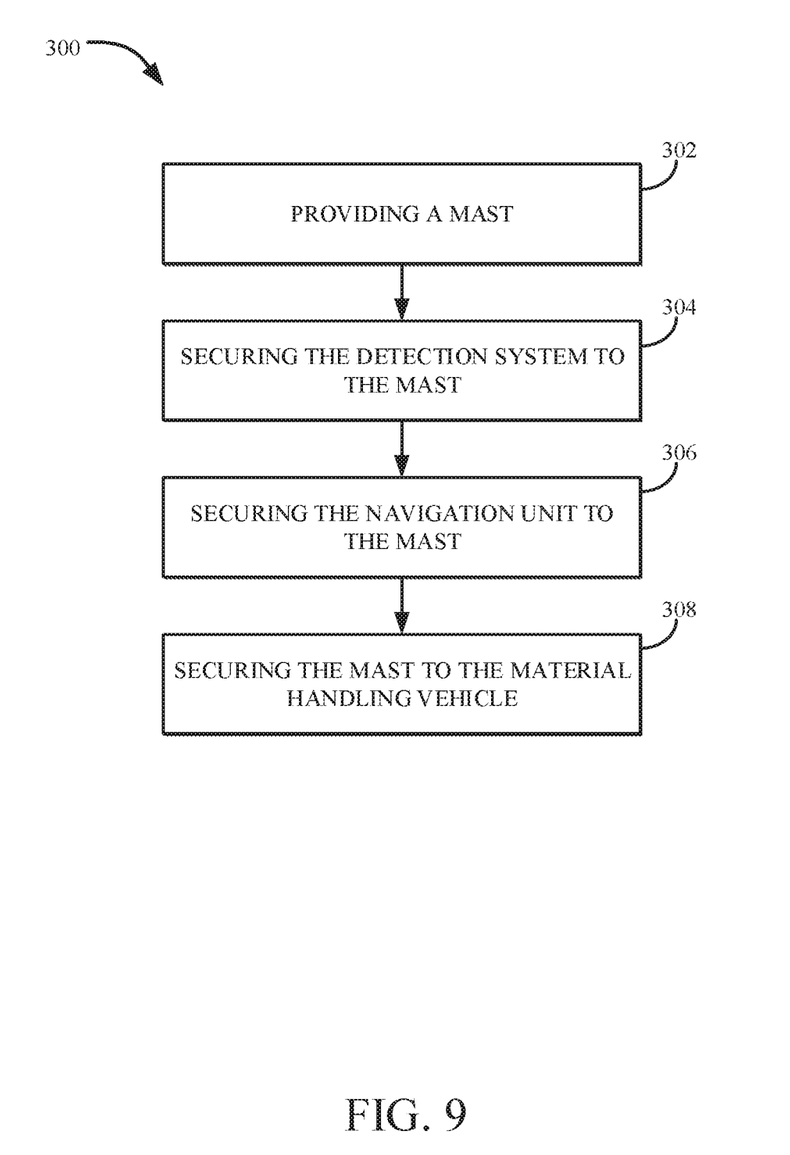
FIG. 9 is a flowchart of a process for installing a mast on a material handling vehicle

FIG. 9 is a flowchart of a process 300 for installing a mast (e.g., the mast 100) on a material handling vehicle (e.g., the material handling vehicle 80). At 302, process 300 includes providing the mast (e.g., the mast 100). In some cases, the mast 100 can be pre-installed, while in other cases, the mast 100 can be constructed accordingly. For example, the support members (e.g., the support members 104) can be connected to the mounting platform (e.g., the mounting platform 110) of the mast. At 304, process 300 includes securing the detection system (e.g., the detection system 150) to the mast. For example, the sensors 156a, and sensor 156b can be mounted to respective portions of the mast. For example, the sensors 156a, and sensor 156b can be positioned, and secured, to a lower side of the mounting platform of the mast. In some embodiments, as described previously, the sensors 156a, and sensor 156b can be mounted to the mast with respective brackets, fasteners, etc. At 306, process 300 includes securing (or mounting) the navigation unit to the mast. In some cases, and as described above, the navigation unit can be secured to the upper side of the mounting platform with fasteners. In other configurations, other mounting, or other securement methods are contemplated to secure the navigation unit to the mast.

At 308, process 300 includes securing the mast to the material handling vehicle. For example, the mast can be mounted to a vehicle body of the material handling vehicle at a location that is frontwards relative to the operator compartment. Similarly, the mast can be mounted on the material handling vehicle, such that the mast remains outside of a field of view of an operator situated in the operator compartment. In some embodiments, the mast can be mounted to the material handling vehicle, such that the mast is positioned below a highest point on the material handling vehicle, and the mast can be mounted such that the mast is frontwards relative to the display, and frontwards relative to the a steering mechanism. The mast can be secured to the material handling vehicle via mounting locations on the mast. For example, fasteners can be directed through respective mounting openings in the mast to threadingly engage holes in the vehicle body of the material handling vehicle, thereby securing the mast to the vehicle body of the material handling vehicle.

While various spatial and directional terms, such as top, bottom, lower, mid, lateral, horizontal, vertical, front, and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

The previous description of the disclosed embodiments is provided to enable any person skilled in the art to make or use the invention. Various modifications to these embodiments will be readily apparent to those skilled in the art, and the generic principles defined herein can be applied to other embodiments without departing from the spirit or scope of the invention. Thus, the invention is not intended to be limited to the embodiments shown herein but is to be accorded the widest scope consistent with the principles and novel features disclosed herein.

Finally, it is expressly contemplated that any of the processes or steps described herein can be combined, eliminated, or reordered. In other embodiments, instructions can reside in computer readable medium wherein those instructions are executed by a processor to perform one or more of processes or steps described herein. As such, it is expressly contemplated that any of the processes or steps described herein can be implemented as hardware, firmware, software, including program instructions executing on a computer, or any combination of thereof. Accordingly, this description is meant to be taken only by way of example, and not to otherwise limit the scope of this invention.

The invention claimed is:

1. A material handling vehicle comprising:
   a vehicle body;
   an operator compartment; and
   a mast including:
      a mounting platform having an upper side, and an opposite lower side;
      a first support member coupled to the mounting platform;
      a second support member coupled to the mounting platform;
      a detection system coupled to the mast, the detection system including:
         a first sensor configured to project a first detection zone, the first detection zone configured to detect an object positioned in the first detection zone; and
         a second sensor configured to project a second detection zone, the second detection zone configured to detect an object positioned in the second detection zone; and
         a third sensor configured to project a third detection zone, the third detection zone configured to detect an object positioned in the third detection zone; and
      an autonomous navigation unit secured to the mounting platform;
   wherein the first sensor, second sensor and third sensor are each mounted to the lower side of the mounting platform,
   wherein the mast is coupled to the vehicle body at a frontward location relative to the operator compartment, and
   wherein the position of the mast on the vehicle body prevents the mast from impeding a field of view of an operator positioned in the operator compartment.

2. The material handling vehicle of claim 1, further comprising:
   a display; and
   a steering mechanism configured to steer the material handling vehicle, and
   wherein the mounting platform of the mast is positioned below the display, and below the steering mechanism, and
   wherein the mounting platform of the mast is positioned forward relative to the display, and forward relative to the steering mechanism.

3. The material handling vehicle of claim 1, wherein the autonomous navigation unit is secured to the upper side of the mounting platform.

4. The material handling vehicle of claim 1, wherein the material handling vehicle has a highest point, and
   wherein the mast is positioned below the highest point of the material handling vehicle.

5. The material handling vehicle of claim 4, further comprising a display, and wherein the display includes the highest point of the material handling vehicle.

6. The material handling vehicle of claim 4,
   wherein the first detection zone extends beyond the highest point of the material handling vehicle,
   and wherein the second detection zone extends beyond the highest point of the material handling vehicle.

7. The material handling vehicle of claim 6, wherein a position of the first sensor is adjustable thereby adjusting a spatial positioning of the first detection zone, and
   wherein a position of the second sensor is adjustable thereby adjusting a spatial position of the second detection zone.

8. The material handling vehicle of claim 1, wherein the first support member of the mast includes:
   a first region;
   a second region connected to the first region; and a third region connected to the second region, the third region being offset from the first region, and
wherein the second support member of the mast includes:
a fourth region;
a fifth region connected to the fourth region; and
a sixth region connected to the fifth region, the sixth region being offset from the fourth region.

9. The material handling vehicle of claim 8, wherein the third region of the first support member includes a first plurality of mounting locations to fasten the third region of the first support member to the vehicle body, and
wherein the sixth region of the second support member includes a second plurality of mounting locations to fasten the sixth region of the second support member to the vehicle body.

10. The material handling vehicle of claim 8, wherein the first region of the first support member, and the fourth region of the second support member is connected to the mounting platform.

11. The material handling vehicle of claim 1, wherein the first detection zone is planar and has a first portion and a second portion separated by a first gap, and
wherein the second detection zone is planar and has a third portion and a fourth portion, separated by a second gap,
wherein the first portion of the first detection zone and the third portion of the second detection zone extend beyond a highest point of the material handling vehicle, and
wherein the first portion of the first detection zone, and the third portion of the second detection zone are separated by a third gap that includes the operator compartment.

12. The material handling vehicle of claim 1, wherein the first sensor and the second sensor are two-dimensional LiDAR sensors.

13. The material handling vehicle of claim 1, wherein the first sensor is angled toward the second sensor, and the second sensor is angled toward the first sensor.

14. The material handling vehicle of claim 1,
wherein the first, second, and third detection zones are planar, and
wherein the third detection zone intersects the first detection zone.

15. The material handling vehicle of claim 14, wherein the first detection zone has a first edge that contours a surface that supports the material handling vehicle, and
wherein the first detection zone intersects the third detection zone at the first edge of the first detection zone.

16. A material handling vehicle comprising:
a vehicle body;
an operator compartment and
a mast coupled to the vehicle body, the mast including:
a mounting platform having an upper side, and an opposite lower side;
a first support member coupled to the mounting platform;
a second support member coupled to the mounting platform;
an autonomous navigation unit secured to the mast; and
a detection system coupled to the mast, the detection system including:
a first sensor configured to project a first detection zone, the first detection zone configured to detect an object positioned in the first detection zone; and
a second sensor configured to project a second detection zone, the second detection zone configured to detect an object positioned in the second detection zone, and
wherein the first sensor and second sensor are each mounted to the lower side of the mounting platform,
wherein the mast is secured to a front portion of the vehicle body, the front portion being frontward relative to the operator compartment,
wherein the material handling vehicle has a highest point, and
wherein the mast is positioned below the highest point of the material handling vehicle.

17. The material handling vehicle of claim 16, further comprising:
a display and
a steering mechanism configured to steer the material handling vehicle,
wherein the mounting platform of the mast is positioned forward relative to the display and forward relative to the steering mechanism, and
wherein the position of the mast on the vehicle body prevents the mast from impeding a field of view of an operator positioned in the operator compartment.

18. A method for installing a mast on a material handling vehicle having a vehicle body, and an operator compartment, the method comprising:
providing the mast having:
a mounting platform having an upper side, and an opposite lower side;
a first support member coupled to the mounting platform; and
a second support member coupled to the mounting platform;
securing a detection system to the mast, the detection system including:
a first sensor configured to project a first detection zone, the first detection zone configured to detect an object positioned in the first detection zone;
a second sensor configured to project a second detection zone, the second detection zone configured to detect an object positioned in the second detection zone; and
a third sensor configured to project a third detection zone, the third detection zone configured to detect an object positioned in the third detection zone;
securing a navigation unit to the mast, the navigation unit being an autonomous navigation unit;
securing the mast to a front portion of the vehicle body, the front portion being frontward relative to the operator compartment;
mounting the first sensor to the lower side of the mounting platform;
mounting the second sensor to the lower side of the mounting platform; and
mounting the third sensor to the lower side of the mounting platform.

* * * * *